United States Patent [19]

Bock et al.

[11] Patent Number: 4,458,757

[45] Date of Patent: Jul. 10, 1984

[54] IN SITU SHALE-OIL RECOVERY PROCESS

[75] Inventors: Jan Bock, Bridgewater; Patrick P. McCall, Matawan; Max L. Robbins, South Orange; Michael Siskin, Livingston, all of N.J.

[73] Assignee: Exxon Research and Engineering Co., Florham Park, N.J.

[21] Appl. No.: 488,171

[22] Filed: Apr. 25, 1983

[51] Int. Cl.³ .............................................. E21B 43/24
[52] U.S. Cl. ..................................... 166/267; 166/303
[58] Field of Search ............... 166/267, 259, 303, 271, 166/272, 273, 274

[56] References Cited

U.S. PATENT DOCUMENTS

| | | | |
|---|---|---|---|
| 2,813,583 | 11/1957 | Marx et al. | 166/271 |
| 3,284,281 | 11/1966 | Thomas | 166/303 X |
| 3,400,762 | 9/1968 | Peacock et al. | 166/303 X |
| 3,501,201 | 3/1970 | Closmann et al. | 166/271 X |
| 3,637,018 | 1/1972 | Kelly et al. | 166/272 |
| 3,730,270 | 5/1973 | Allred | 166/303 |
| 4,286,660 | 9/1981 | Wagner et al. | 166/275 X |

Primary Examiner—Stephen J. Novosad
Assistant Examiner—Bruce M. Kisliuk
Attorney, Agent, or Firm—Henry E. Naylor

[57] ABSTRACT

Disclosed is a process for converting organic material of oil-shale to predominantly liquids. The oil-shale is first heated to a temperature from about 360° C. to 475° C. in an anionic atmosphere. The resulting liquids and gases are collected and the residue is extracted with a microemulsion capable of extracting organic material from the heat treated oil-shale.

15 Claims, 1 Drawing Figure

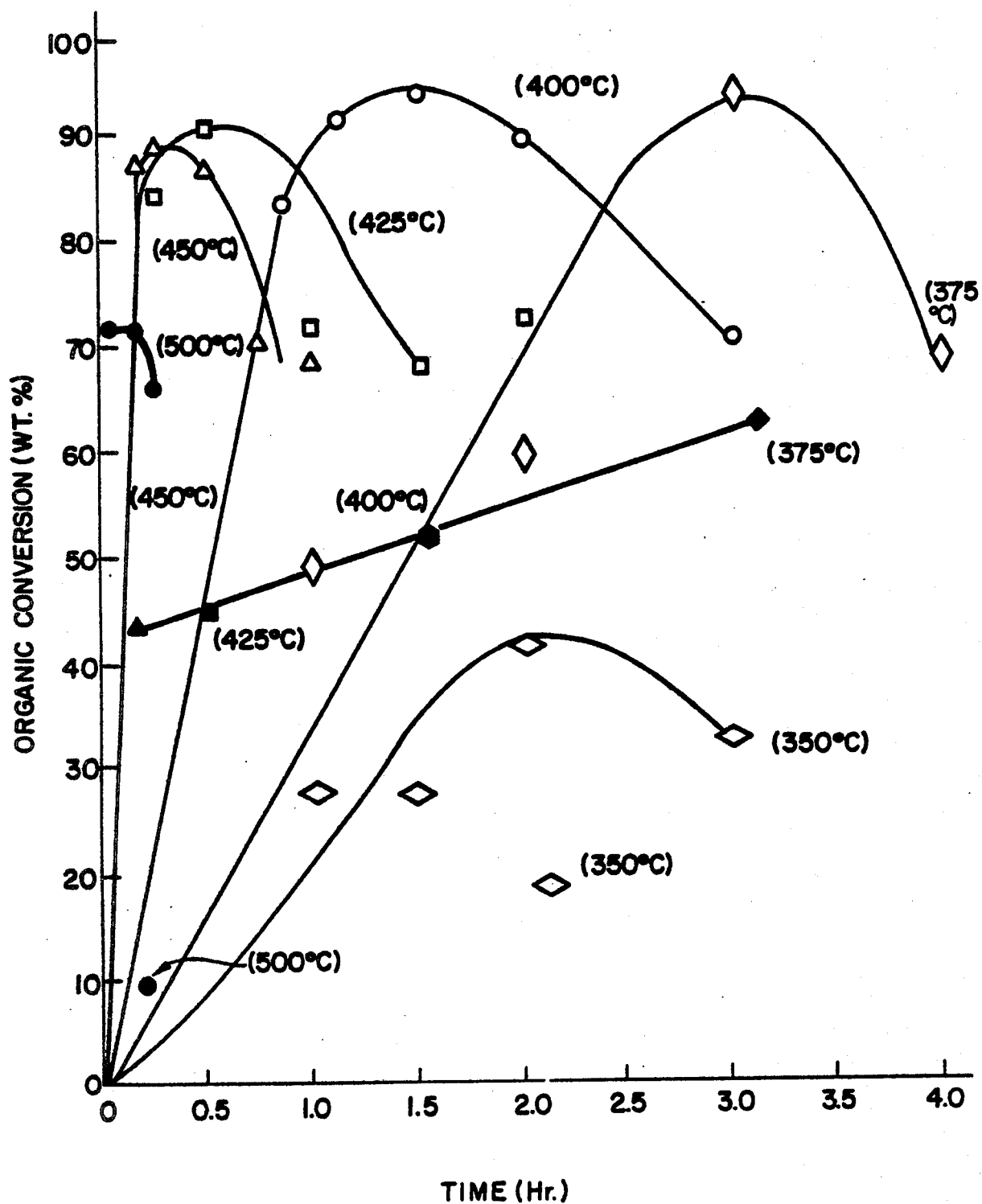

IN SITU SHALE-OIL RECOVERY PROCESS

BACKGROUND OF THE INVENTION

The present invention relates to a process for recovering shale-oil in situ. A section in an oil-shale deposit is fractured and heated to a temperature from about 360° C. to about 475° C. The resulting rubble, or fractured oil-shale, is then cooled to a temperature below the boiling point of water at the operating pressure and then contacted with a microemulsion which extracts and absorbs shale-oil. The microemulsion is then brought to the surface and a substantial fraction of shale-oil is recovered therefrom.

Oil-shale, one of the leading sources under investigation for the production of synthetic fuels, may play a leading role in the energy future of the United States. The primary reason for the growing importance of oil-shale, as well as coal, is the rapid depletion of known petroleum and natural gas reserves. These known reserves are being depleted at a faster rate than the rate of discovering new reserves. As the era of petroleum growth draws to a close, the world's energy mix will have to change. Transition energy sources will be needed as a bridge between petroleum and the potentially unlimited energy sources of the future; such sources being, for example, solar power and nuclear fusion. Owing to their great abundance, coal and oil-shale are perceived as the keystones of such a bridge. Consequently, a great deal of research and development is presently in progress to provide economical ways of converting these solid resources to valuable liquids and gases.

Although most conventional processes for recovering oil from oil-shale involve the mining and retorting of oil-shale, there is a considerable amount of interest in, in place or in situ processing in order to eliminate a substantial portion of the mining and handling costs associated with conventional processes.

Furthermore, in situ processes may be applicable to deposits of various thicknesses, grades, and amounts of overburden that are not readily amenable to mining. In addition, it eliminates the necessity of disposing of large quantities of spent shale.

In general, conventional in situ processes for obtaining oil from oil-shale comprises drilling wells having a predetermined pattern into the oil-shale formation, fracturing to create permeability, or rubble, igniting the shale in one or more of the wells, pumping air down the ignition well to support combustion, forcing hot combustion gases through the oil-shale to convert solid organic matter of the shale into oil, and recovering the oil thus generated from other wells in the pattern. Conventional fracturing techniques include hydraulic pressure, chemical explosives, and nuclear explosives. Although such in situ processes have been in the testing stages for at least about 20 years, they are generally ineffective and result in a relatively low oil recovery.

SUMMARY OF THE INVENTION

In accordance with the present invention, there is provided an improved in situ process for extracting oil from a block of fractured oil-shale. The process comprises; (a) fracturing a block of oil-shale to an effectivve degree (b) heating the block of fractured oil-shale to a temperature from about 360° C. to about 475° C.; (c) maintaining the block of fractured oil-shale in such temperature range for an effective period of time; (d) cooling the block of fractured oil-shale to a temperature which is below the effective boiling point of the aqueous phase of the microemulsion of step (e) below; (e) introducing a microemulsion, or coarse emulsion containing a microemulsion phase, capable of absorbing shale-oil, into the block of fractured oil-shale to absorb shale-oil. The shale-oil can then be recovered by collecting the oil-absorbed microemulsion from the block of fractured oil-shale and treating the oil-absorbed microemulsion to recover the oil therefrom.

The microemulsion is comprised of: (i) about 0.3 to about 98 wt.% of an extracting agent capable of extracting organic material from the heat treated oil-shale; (ii) about 1 to about 99 wt.% of water containing up to about 25 wt.% of dissolved inorganic salts; and (iii) about 0.2 to about 20 wt.% of at least one surfactant capable of forming microemulsion.

In one preferred embodiment of the present invention the extracting agent of the microemulsion is a low boiling point cut of the liquids recovered from the oil-shale by the practice of the present invention.

In another preferred embodiment of the present invention the surfactant of the microemulsion is an anionic surfactant such as a sulfonate.

BRIEF DESCRIPTION OF THE FIGURE

The sole FIGURE shows plots of conversion of organic material to liquids and gases versus time for Green River oil-shale extracted both within and outside the limitations of temperature and time of the present invention. Although microemulsions were not used for the extractions, the FIGURE is presented to show the criticality of the heat treatment of the oil-shale prior to extraction.

DETAILED DESCRIPTION OF THE INVENTION

The general composition and characteristics of oil-shale are well-known and will therefore not be described in detail herein. For practical purposes, the oil-shale should contain at least about 10, preferably at least about 20, and more preferably between about 25 and 75 gallons of oil per ton of oil-shale, by Fischer Assay.

Although the present invention can be practiced on any type of oil-shale, it is more advantageous to employ an oil-shale having a relatively high hydrogen to carbon atomic ratio (H/C). Non-limiting examples of such oil-shales include Rundle oil-shale from Australia, having an H/C of about 1.57, and Green River oil-shale from Colorado, having an H/C of about 1.55. Devonian oil-shale, which has an H/C of 1.11, can also be treated in accordance with the present invention.

Any suitable method of fracturing a block of oil-shale may be used in the practice of the present invention as long as the fracturing method achieves an effective degree of fracturing. By effective degree of fracturing we mean the resulting fractured block of oil-shale has the necessary surface area and permeability to make the practice of the present invention feasible. The degree of permeability will depend on such factors as, the economics of the overall process and the desired degree of oil-extraction. Non-limiting examples of methods which may be used to fracture a block of oil-shale in the practice of the present invention include hydraulic pressure, chemical explosives, and nuclear explosives.

After a suitable block of fractured oil-shale has been created, the block is heated to a temperature from about 360° C. to about 475° C. for an effective period of time. By effective period of time, we mean the amount of time the fractured oil-shale must be maintained at such temperatures to achieve at predetermined degree of the recovery level achievable by the practice of the present invention. That is, if the fractured oil-shale is maintained at such temperatures for too short, or too long, a period of time a relatively small amount of shale-oil will be extracted and absorbed by subsequent treatment with the microemulsion. Although not wishing to be limited by theory, we believe that depolymerization of the organic material is not complete enough for the shorter periods of time and that polymerization reactions are too extensive for the longer periods of time. If polymerization reactions are allowed to proceed to an undesirable degree, insoluble refractory type material is obtained. Consequently, there exists a temperature range in which there is an advantageous balance of depolymerization and polymerization wherein substantially maximum yields are obtained during subsequent extraction. The precise temperature employed will of course depend on such things as the particular oil-shale being treated and the desired amount of shale-oil one wishes to recover. This precise temperature can be easily determined by one having ordinary skill in the art given the teaching herein and, consequently, will not be discussed in further detail.

Heat can be supplied to the block of fractured oil-shale by any suitable means. Non-limiting examples of means which are suitable for the practice of the present invention include underground combustion and the introduction of heated gases, such as flue gases, or liquids to the block of fractured oil-shale.

The sole FIGURE herein illustrates the need for maintaining the fractured oil-shale at the predetermined temperature for an effective period of time by showing the effect of residence time at various temperatures. In fact, it is this concept of a limited window of residence times which allows one to recover a relatively large amount of the oil from oil-shale under such relatively mild thermal conditions. The residence times employed in the practice of the present invention will range from about 1 minute to about 270 minutes.

The term "microemulsion" refers to a stable, transparent or translucent micellar solution or dispersion of oil, water or brine, and at least one amphiphilic compound or surfactant. As herein used, "microemulsion" implies no other restrictions with regard to internal microstructure, micelle shape or size, or physical properties. Microemulsions can either be substantially water continuous, substantially oil continuous or bicontinuous. The term "microemulsion" also encompasses "birefringent microemulsions", the latter exhibiting the properties of anisotropy and birefringence which are characteristic of liquid crystals. Thus, the present microemulsions broadly comprise micellar formulations which include from 0.3 to 98 wt.% of an extracting agent, 1 to 99 wt.% of water containing up to 25 wt.% of dissolved inorganic salts, and 0.2 to 15 wt.% of at least one surfactant. Although microemulsions are preferred, coarse emulsions may also be used in place of microemulsions in the practice of the present invention. Coarse emulsions, as used herein, are microemulsion systems as defined above but admixed with an excess aqueous phase or an excess oil phase.

Increased temperature results in excess oil rejection for sulfonate microemulsions and decreased temperature results in excess oil rejection for ethoxylate microemulsions. This oil forms a coarse emulsion which turns the system opaque. The temperature at which this oil rejection takes place is called the upper cloud point (UCP) for sulfonate microemulsions and the lower cloud point (LCP) for ethoxylate microemulsions. Water rejection on cooling yields a (LCP) for sulfonate microemulsions and UCP for ethoxylate microemulsions. It is this temperature sensitivity of balanced single phase microemulsions which suggests the use of microemulsions for extracting shale oil.

It is these properties of microemulsions which allow their use in extracting shale-oil in the practice of the present invention. After the heat treated fractured oil-shale is contacted with the microemulsion, the microemulsion will absorb a substantial portion of the shale-oil. The microemulsion can then be recovered and treated to release the shale-oil. If the microemulsion is a sulfonate microemulsion, it can be heated to cause a phase separation in which a lower phase microemulsion is in equilibrium with excess oil. The excess oil phase will contain extracted shale-oil in addition to the extracting agent or oil used for making the microemulsion. This excess oil is separated from the microemulsion phase and distilled to recover the microemulsion oil which is then recycled leaving the heavy shale-oil for further processing.

The oil which is used to comprise the microemulsion is a reagent, also referred to herein as "extracting agent," which is capable of solubilizing organic material of the heat treated oil-shale. Non-limiting examples of such reagents include refined crude oil, synthetic oil, or boiling fraction thereof e.g., a sweet or sour crude, synthetic crude, such as shale oil, refined fraction such as kerosene, diesel oil, lube oil, aromatic naphtha or white oil boiling at from 80° to 345° C., $C_6$ to $C_{22}$ aliphatic hydrocarbon aromatic hydrocarbon boiling at from 80° to 300° C. or mixtures thereof. Also included are BTX streams or components thereof, a low boiling point cut (20° C. to 200° C.) of the liquids produced in accordance with the present invention as well as solvents such as tetrahydrofuran (THF), tetralin, toluene, cyclohexane, and octane, and mixtures thereof. Preferred is a low boiling point cut of the liquids produced by the practice of the present invention. By BTX streams, we mean streams comprised essentially of benzene, toluene, and xylene. The amount of oil employed can vary over wide ranges of from 0.3 to 98% by weight, based on the microemulsion.

In order to form a microemulsion, a surfactant or mixture of surfactants must be present in at least an amount effective to form micelles. The amounts of surfactants employed are generally from 0.2 to 20%, preferably 0.2 to 15%, more preferably from 0.2 to 10% and most preferably from 0.5 to 8% by weight, based on the microemulsion. Co-surfactants may be present in amounts of from 0 to 15 wt.%, preferably 0.2 to 10 wt.%. Larger amounts are possible but are not usually feasible from an economic standpoint.

Surfactants suitable for use in the microemulsions herein may be anionic, cationic, nonionic amphoteric, or mixtures thereof. The choice of the surfactant system is generally predicated upon conditions within the oil-shale deposit. For example, if high salinities are present, combinations of anionic surfactant with cationic or nonionic co-surfactants may be desirable. Regardless of the particular surfactant system used, the ratio of co-surfactant to anionic surfactant must be adjusted or balanced to accommodate the desired salinity and temperature ranges and achieve high oil uptake in the microemulsion and low interfacial tensions vs. oil.

Anionic surfactants and co-surfactants include sulfonates, sulfates, carboxylates, and phosphates which may be present in the acid or salt form. Sulfonates and sulfates are preferred.

Anionic sulfonates may have the formula $$[R^1—SO_3]^-Y^+$$

wherein $R^1$ is $C_8$ to $C_{25}$ aliphatic, $C_{14}$ to $C_{36}$ alkylaryl or $R^2—(OCH_2CH_2)_n$ where $R^2$ has the same definition as $R^1$ and n is an integer from 1 to 60, and Y is hydrogen or a monovalent cation such as alkali metal or $N(R^3)^+_4$ where each $R^3$ is independently hydrogen, alkyl or hydroxy substituted alkyl, each of 1 to 4 carbon atoms. Preferred alkylaryl include alkylphenyl, alkyltolyl and alkylxylyl having from 8 to 26 carbons in the alkyl. Especially preferred are alkylbenzene and alkylxylene sufonates wherein the alkyl group contains from 8 to 18 carbon atoms. Sulfonated ethoxylated $C_8$ to $C_{26}$ alkylphenols and sulfonated ethoxylated dinonyl phenols containing from 8 to 50 —$CH_2CH_2O$— groups are preferred anionic co-surfactants. The aliphatic chain in $R^1$ may be interrupted by ester or amide linkages. Anionic surfactants may also be petroleum sulfonates which are derived from the treatment of petroleum oils with strong sulfuric acid.

The anionic sulfate surfactants have the formula $$[R^4—OSO_3]^-Y^+$$

Where $R^4$ is $C_8$ to $C_{25}$ aliphatic, $C_{14}$ to $C_{38}$ alkylaryl or $R^5—(OCH_2CH_2)_n$ where $R^5$ has the same definition as $R^4$ and n is an integer from 1 to 60, and Y is hydrogen, alkali metal cation of $N(R^3)^+_4$, where each $R^3$ is independently hydrogen, alkyl of 1 to 4 carbon atoms or hydroxyalkyl of 1 to 4 carbon atoms. The aliphatic chain in $R^4$ may be interrupted by $$-\overset{O}{\overset{\|}{C}}-NH, -\overset{O}{\overset{\|}{C}}-O- \text{ or } -OCH_2CH_2-$$

linkages. Examples include sulfated alkanols or sulfated ethoxylated alkanols, especially sulfated ethoxylated $C_{12}$-$C_{16}$ alkanols.

Also suitable as anionic surfactants are $C_8$ to $C_{30}$ aliphatic carboxylates wherein the aliphatic chain may be interrupted by amido linkages, and aromatic carboxylates such as $C_8$ to $C_{36}$ alkyl substituted benzoic acids. Carboxylates derived from fatty acids are preferred. Other anionics include esters derived from the oxy acids of phosphoric acid such as phosphoric acid, ortho- and polyphosphoric acids. The esters are derived from $C_6$ to $C_{24}$ alkanols and alkylphenols wherein the ester linkage or alkyl chain may be interrupted by ethoxy or amido groups.

Anionic surfactants may also have the formula $$R_aO(C_3H_6O)_m(C_2H_4O)_nYX$$

where $R_a$ is a $C_8$ to $C_{30}$ aliphatic radical or benzene substituted by $C_6$ to $C_{24}$ alkyl or alkenyl, m and n are at least 1 and preferably have average values between about 1 and 10, respectively; Y is sulfate, sulfonate, carboxylate or phosphate and X is a cation. These surfactants are further described in European Patent Application, Publication No. 0003183 A-1 which is incorporated herein by reference.

Nonionic surfactants are ethoxylated derivatives of phenols, amines, carboxylic acids, alcohols and mercaptans, as well as polyhydroxy compounds. The ethoxylated phenols may have the formula $$(R^6)_r—A—[O(CH_2CH_2O)_p]_q^H$$

wherein $R^6$ is $C_1$ to $C_{24}$ alkyl, A is benzene, naphthalene or diphenyl, p is 2 to 60, q is 1 or 2 and r is 1 to 5 with the proviso that when r is 1, $R^6$ is at least $C_8$. Preferred nonionic surfactants are ethoxylated $C_8$-$C_{24}$ alkylphenols, ethoxylated octyl, nonyl or dodecyl phenols containing 8 to 24 —$CH_2CH_2O$-groups, or ethoxylated dinonyl phenols containing 8 to 50 —$CH_2CH_2O$-groups.

Ethoxylated amines may be cationic or nonionic depending on the degree of ethoxylation. Higher degrees of ethoxylation render fatty amines nonionic in character. Preferred amines are $C_8$ to $C_{30}$ alkyl amines, $C_8$ to $C_{30}$ ethoxylated amines or quaternary ammonium salts thereof. Ethoxylated amines of the formula $$R^7—N\begin{cases}(CH_2CH_2O)_xH \\ (CH_2CH_2O)_yH\end{cases}$$

where $R^7$ is a $C_8$ to $C_{30}$ aliphatic radical and the sum of x+y is from 2 to 30 are preferred.

Aliphatic carboxylic acids of from 8 to 30 carbon atoms can be esterified with ethylene oxide to form nonionic surfactants. The degree of ethoxylation may be from 2 to 30. Also, $C_8$ to $C_{25}$ alkanols and mercaptans can be converted to polyethoxy ethers and thio-ethers by reaction with ethylene oxide.

Examples of nonionic surfactants which are not polyethoxylated are esters of sugar alcohols, sorbitol and mannitol. The acid moiety of the ester is generally a fatty acid. Other fatty acid derivatives include esters of di- and poly saccharides and condensates of fatty acids with alkanolamines.

Suitable cationic surfactants are amines, polyamines and quaternary ammonium salts. The amines are higher aliphatic amines of from 8 to 30 carbon atoms and may be primary, secondary, or tertiary. Examples of higher aliphatic amines are straight and branched chain alkyl amines, fatty amines and rosin amines. The aliphatic chain may be interrupted by one or more ester, ether, or amido linkages. Also suitable are heterocyclic 5 or 6 membered ring systems containing nitrogen and optionally oxygen as hetero atoms and bearing an alkyl group of 8 to 20 carbon atoms. Examples of heterocyclic rings are imidazole, pyrimidine, oxazoline, piperazine and guanadine. The amines may also be di- or triamines derived from fatty amines. Examples of diamines derived from fatty amines are sold under tradename Duomeens by Armak Co.

Preferred cationics are derived from the ethoxylation of higher aliphatic primary or secondary amines with ethylene oxide wherein the degree of ethoxylation is from 2 to 30. Particularly preferred are ehtoxylated amines of the formula:

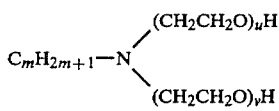

where m is from 8 to 25 and the sum of u+v is from 2 to 20. This type of amine is manufactured by the Armak Co. and sold under the tradename Ethomeen.

Another preferred class of cationic surfactants are quaternary ammonium salts. The quaternary salts are usually derived from tertiary amines by reaction with alkyl halides or sulfates. The tertiary amines are those described above, e.g., higher aliphatic, heterocyclic and ethoxylated higher aliphatic.

Amphoteric surfactants usually contain an amino moiety as the basic function and a carboxylic or sulfonic acid as the acidic function. Examples of aminocarboxylic acids are $R^8NHR^9COOH$ where $R^8$ is $C_8$ to $C_{20}$ aliphatic and $R^9$ is $C_1$ to $C_8$ alkyl, $[(R^{10})_3 N-(CH_2)_{1-5}-COO-]$ where $R^{10}$ is $C_1$ to $C_{22}$ aliphatic, condensation products of ethylendiaminetetraacetic acid and fatty acids, and N-alkyl derivatives of aspartic acid. Examples of amino-sulfonic acids are

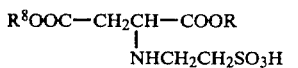

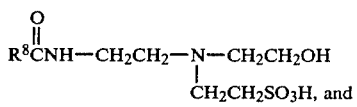

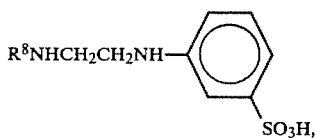

$R^8$ and $R^9$ being defined as above. Imidazole derivatives form another class of amphoterics, i.e.,

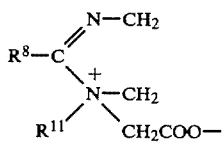

where $R^{11}$ is $C_1$ to $C_8$ alkyl, $C_2H_4OH$ or $C_2H_4NH_2$.

If the anionic surfactants are used in combination with anionic, nonionic, or cationic co-surfactants, then a preferred surfactant combination contains alkyl or alkylaryl sulfonates or sulfates as the anionic component and ethoxylated aliphatic amines as the cationic or non-ionic component. Other preferred combinations include alkylaryl sulfonates with ethoxylated or sulfated ethoxylated alkanols or alkyl phenols. Especially preferred are alkyl xylene sulfonates with $C_{18}$ ethoxylated amines containing 5–15 EO ($-CH_2CH_2O-$) groups and alkyl xylene sulfonates with ethoxylated or sulfonated ethoxylated di-nonyl phenols containing 8 to 50 EO units. Examples of preferred combinations are i-dodecyl-o-xylene sulfonic acid or sodium salt thereof with ethoxylated octadecyl amine having from 2–15 EO groups and the sodium, ammonium, monoethanolamino, diethanolamino, and triethanolamino salts of i-dodecyl-o-xylene sulfonic acid with ethoxylated, sulfated ethoxylated and sulfonated ethoxylated octyl phenol, -nonyl phenol, -dinonyl phenol, -dodecyl phenol, and -tridecanol, wherein the number of EO groups ranges from 4 to 50.

The surfactant component of the present microemulsions can be prepared by conventional methods well-known in the art. An extensive review of processes for synthesizing and manufacturing surfactants can be found in "Surface Active Agents and Detergents," Vol. II, Part I by Schwartz et al (Interscience Publishers, 1958), which is incorporated herein by reference.

The microemulsions of the present invention are also prepared by well-known techniques. Generally, an oil, water or brine and an amount in excess of the critical micelle concentration of a surfactant and a co-surfactant are combined. The ratio of surfactant to co-surfactant is balanced for the desired salinity and temperature. The surfactant and co-surfactant are chosen to maximize the solubilization of the given oil at the desired salinity. Generally, higher salinity requires a more hydrophilic co-surfactant.

The surfactant is chosen from a group having an optimal salinity less than the desired salinity whereas the co-surfactant is chosen from a group having an optimal salinity greater than the desired salinity. The optimal salinity of a surfactant is defined as that salinity at which water and oil uptake are equal in a microemulsion containing the specified oil at the specified temperature. The ratio of surfactant to co-surfactant is adjusted to accomodate the desired salinity, temperature, oil composition, surfactant composition, and oil:water ratio such that the system is a single transparent or translucent phase which is stable to gravity settling. Under some conditions, the resulting microemulsion may be a "birefringent microemulsion", i.e., it may exhibit anisotropy and birefringence which are characteristics of liquid crystals.

If it is desirable to displace the oil towards production means which are in fluid communication with injection means, a driving fluid is used to force the microemulsion complex through the field. Water or brine are usually used for this purpose. The amounts of driving fluid may range from about 0.5 to 3 pore volumes. It is desirable for the viscosity of the driving fluid to be at least equal to that of the microemulsion complex in order to minimize any "fingering" effects that can arise when a less viscous fluid is used to displace a more viscous fluid.

Preferred driving fluids are therefore thickened water or thickened brine. Any of the conventional thickening agents can be used including water soluble polymers, e.g., polysaccharides, biopolymers such as xanthan gums, partially hydrolyzed polyacrylamides and sulfonated polyacrylamides and sulfonated polyacrylamides, fatty acid detergents, alginates, sucrose, dextran, amines, glycerine and mixtures thereof. If desired, the thickened water or brine can be followed by injection of unthickened water.

From 0 to 15% by weight of co-solvents and one or more co-surfactants may optionally be incorporated into the microemulsions to assist in microemulsion formulation. Preferred co-surfactants and/or co-solvents include alcohols, ethoxylated-, sulfated ethoxylated- and sulfonated ethoxylated alcohols, all of which are $C_3$ to $C_{20}$ in the aliphatic chain as well as ethoxylated, sulfated ethoxylated- and sulfonated ethoxylated phenols.

The following examples serve to more fully describe the manner of practicing the above-described invention, as well as to set forth the best modes contemplated for carrying out various aspects of the invention. It is to be understood that these examples in no way serve to limit the true scope of this invention, but rather, are presented for illustrative purposes.

HEAT TREATMENT EXPERIMENTS

Examples 1-12 and Comparative Examples A-G demonstrate that the oil-shale must be heat treated in accordance with the present invention in order for a substantial portion of the shale-oil to be extractable with extracting agents employed herein.

EXPERIMENTAL APPARATUS FOR HEAT TREATMENT EXAMPLES

Thermal treatment was performed in a pyrolysis unit comprised of a lower reactor section and an upper condenser section. The reactor section consisted of a tared quartz tube closed at the bottom and the condenser consisted of a tared Pyrex tube packed with tared 3 mm Pyrex beads supported on a stainless steel screen. Quartz wool was packed in the bottom of the condenser and glass wool was packed at the top. A narrow stainless steel tube extended through the condenser and halfway into the reaction tube to allow the introduction of nitrogen gas into the reaction tube to facilitate the sweep-out of primary pyrolysis products.

Dry ice was used to cool the condenser section and a stainless steel heating block was used during the thermal treatment step. The stainless steel block contained a cavity bored partially therethrough so that the pyrolysis unit could be placed therein in such a way that the reaction tube was incased in the block. The cavity was partially filled with gallium (mp 29.8° C., bp 2403° C.) to facilitate rapid heatup (about one min.).

THERMAL TREATMENT STEP

About two grams of oil-shale was placed in the reaction tube. A nitrogen purge of 40 cc/min. was provided and dry ice was packed around the condenser section. After cooling for about 5 minutes, the unit was placed in the heating block at a preselected temperature from about 350° C. to 500° C. for a preselected period of time. The entire unit, with dry ice and nitrogen purge maintained, was removed from the heating block and allowed to cool to room temperature (about 25° C.). The dry ice and nitrogen purge was removed, but the liquid reaction product on the condenser beads and the non-volatilized residue were maintained under a nitrogen atmosphere. The pyrolysis unit was then weighed to obtain conversion to gases. The unit was then separated and the condenser section was placed in a nitrogen-purged dry box. The pyrex beads, quartz wool, and condenser walls were washed with methylene chloride which was subsequently evaporated in a tared flask under a stream of nitrogen and weighed to obtain conversion of oil-shale to shale oil product.

EXTRACTION STEP

The reaction tube containing the remaining solids was weighed and transferred to a tared Soxhlet thimble, which was then weighed and Soxhlet extracted for about 48 hrs., under a nitrogen atmosphere, with tetrahydrofuran (THF) (bp 67° C.) which had been distilled from sodium-benzophenone to assure purity and dryness. After extraction, the solid residue was dried overnight in a vacuum oven at about 100° C. and weighed. The THF solution was rotovaporated at 55°-60° C. and the liquid products were weighed to obtain the degree of conversion to shale oil.

EXAMPLES 1-8 AND COMPARATIVE EXAMPLES A AND B

Samples of Green River, Rundle, and Devonian oil-shale were thermally treated and extracted by following the general procedure set forth above except that each sample differed with respect to the temperature and the duration at which the sample was thermally treated. Tables I, II, and III below show the percent of organic conversion for Green River, Rundle, and Devonian oil-shale respectively. The hydrogen to carbon atomic ratio for the oil-shales were 1.55 for Green River, 1.57 for Rundle, and 1.11 for Devonian.

TABLE I

Conversion of Green River Oil-Shale

| Example (Temp. °C.) | Time Thermal Step | Conversion of Organic Material (Wt. %) | | |
|---|---|---|---|---|
| | | Thermal Step | Extraction Step | Total |
| Comp. A (350° C.) | 1 hr | 8.59 | 19.23 | 27.82 |
| | 1.5 | 10.80 | 16.52 | 27.32 |
| | 2 | 14.35 | 27.15 | 41.50 |
| | 3 | 16.05 | 16.46 | 32.51 |
| Ex. 1 (375° C.) | 1 hr | 16.07 | 32.13 | 48.20 |
| | 2 | 23.48 | 34.16 | 58.09 |
| | 3 | 30.90 | 61.80 | 92.70 |
| | 4 | 28.43 | 39.55 | 67.98 |
| Ex. 2 (400° C.) | 0.75 hr | 36.40 | 59.78 | 96.22 |
| | 1.25 | 53.54 | 38.39 | 91.93 |
| | 1.5 | 43.63 | 50.25 | 93.88 |
| | 2 | 52.56 | 36.73 | 89.29 |
| | 3 | 55.26 | 14.86 | 70.12 |
| Ex. 3 (425° C.) | 0.25 hr | 41.19 | 42.91 | 84.10 |
| | 0.5 | 46.57 | 44.22 | 90.79 |
| | 1 | 57.31 | 14.48 | 71.79 |
| | 1.5 | 58.45 | 9.34 | 67.79 |
| Ex. 4 (450° C.) | 0.17 hr | 33.50 | 53.86 | 87.36 |
| | 0.25 | 55.19 | 33.68 | 88.87 |
| | 0.50 | 76.71 | 9.73 | 86.44 |
| | 0.75 | 58.10 | 12.10 | 70.20 |
| Ex. 5 (475° C.) | 5 min. | 32.90 | 67.74 | 99.83 |
| | 10 min. | 50.02 | 21.14 | 76.16 |
| | 15 min. | 56.77 | 9.14 | 65.91 |
| | 20 min. | 60.87 | 9.45 | 70.32 |
| Comp. B (500° C.) | 5 min. | 57.63 | 11.90 | 69.53 |
| | 10 min. | 62.12 | 7.90 | 70.02 |
| | 15 min. | 60.90 | 3.66 | 64.56 |

TABLE II

Conversion of Rundle Oil-Shale

| Example (Temp. °C.) | Time Thermal Step | Conversion of Organic Material (Wt. %) | | |
|---|---|---|---|---|
| | | Thermal Step | Extraction Step | Total |
| Ex. 6 (400° C.) | 1 hr | 18.85 | 31.80 | 50.65 |
| | 1.5 | 25.82 | 38.05 | 63.87 |
| | 2 | 25.83 | 21.74 | 47.57 |
| Ex. 7 (425° C.) | 0.75 hr | 24.73 | 21.20 | 45.93 |
| | 1 | 45.93 | 40.05 | 85.98 |
| | 1.5 | 36.03 | 38.80 | 74.83 |
| | 2 | 49.62 | 15.04 | 64.66 |

TABLE III

| | | Conversion of Devonian Oil-Shale | | |
|---|---|---|---|---|
| | Time | Conversion of Organic Material (Wt. %) | | |
| Example (Temp. °C.) | Thermal Step | Thermal Step | Extraction Step | Total |
| Ex. 8 (425° C.) | 1 hr | 26.09 | 21.74 | 47.83 |
| | 1.5 | 35.12 | 18.39 | 53.51 |
| | 2 | 40.13 | 6.69 | 46.82 |
| | 3 | 40.04 | 10.01 | 50.05 |

The data of Table II above appears in the sole FIGURE hereof in plotted form. It can be seen from the data of the above tables that total conversion of organic material in oil-shale, to liquids, decreases as the duration of thermal treatment increases. Although not wanting to be limited by theory, it is believed that this occurs because unfavorable thermal condensation reactions of the non-volatile conversion products is taking place. It can also be seen by the data in these Tables that an optimum time and temperature range exists for obtaining maximum conversion.

The solid symbols connected by the straight line in the FIGURE hereof indicate the amount of material which is extractable at the maximum conversion point at each temperature. The data of these tables is contrary to the teaching of Hubbard and Robinson which reinforces the general belief that the extraction step is unnecessary because it was thought that comparable conversions could be obtained by prolonged heating only. The data also show that temperature extremes are unsuitable; i.e., 350° C. is too low a temperature and 500° C. is too high a temperature for obtaining relatively high organic conversions by the instant invention.

Furthermore, the data show that at the residence times required for peak conversions, a significant portion of the liquid product is recovered by extraction. Consequently, in order to obtain maximum recovery of the organic material, there must be a compromise between recovery of volatile products, recovery of extractable products, and loss of potentially valuable liquid products to coke.

EXAMPLES 9, 10 AND COMPARATIVE EXAMPLES C TO E

Samples of Green River and Rundle oil-shale were thermally treated for 1 hour at 400° C. and extracted in accordance with the aforementioned general procedure except the samples designated as comparative examples were subjected to distillation at 500° C. immediately after thermal treatment. All samples were extracted for 48 hours with THF by Soxhlet extraction according to the general procedure. Comparative examples C and E were distilled for 10 minutes. Table IV below sets forth the weight percent conversion of organics achieved for each example.

TABLE IV

Conversion to Liquid/Efficiencies of Distillation vs. Extraction After Thermal Treatment of Oil-Shale

| Example | Thermal °C. | Time | Distillation °C. | Time | Wt. % Conversion w/o Extraction | Wt. % Conversion with Extraction |
|---|---|---|---|---|---|---|
| Comp. C(GR) | 400 | 1 | 500 | 15 | 63.0 | 73.5 |
| Comp. D(GR) | — | — | 500 | 10 | 62.1 | 70.0 |
| 9 (GR) | 400 | 1 | — | — | 43.3 | 94.4 |
| Comp. E(R) | 400 | 1 | 500 | 15 | 66.9 | 79.4 |
| 10 (R) | 400 | 1 | — | — | 39.8 | 89.9 |

GR = Green River oil-shale
R = Rundle oil-shale

The data of Table IV illustrate that the organic material of the oil-shale which is depolymerized during the thermal treatment cannot be recovered by subsequent distillation at conventional retorting temperatures, but can be extracted as liquids with a solvent such as THF. The data also show that approximately 50% more organic liquids can be extracted after a relatively mild thermal treatment, whereas distillation is capable of recovering only about 10% more liquids from the oil-shale after the mild thermal treatment. This data indicate that conventional retorting temperatures result in decreased conversion of oil-shale to organic liquids because detrimental side reactions occur more rapidly then distillation at these temperatures.

EXAMPLE 11

A sample Green River oil-shale was thermally treated at 400° C. for 1 hour in accordance with the general procedure. The resulting residue produced 40 wt.% of thermal products and 44 wt.% of extractable liquids. The remaining residue was reheated at 400° C. for 1 hour and extracted as described in the general procedure; the remainder of the organic material was recovered. This example demonstrates that the resulting solid residue is not an unconverted residue, but is in fact material which is incompletely converted. The mild thermal treatment of the process of the present invention does not cause substantial degradation of the organic material in oil-shale. Degradation would lead to intractable coke materials via condensation reactions as evidenced in Table IV above.

EXAMPLE 12 AND COMPARATIVE EXAMPLES F AND G

Three samples of Green River oil-shale were trated in accordance with the general procedure hereof except air and carbon dioxide were used, instead of nitrogen, during the thermal treatment step (400° C. for 2 hours) for two of the samples. Table V below sets forth the conversion data for these samples after the extraction step.

TABLE V

Effect of Atmosphere During Thermal Step

| Example | Atmosphere | Conversion of Organics to Liquids (Wt. %) |
|---|---|---|
| 12 | $N_2$ | 82.5 |
| Comp. F | Air | 76.0 |
| Comp. G | $CO_2$ | 74.6 |

These data show that an inert atmosphere is required during the thermal step in order to achieve high conversions.

MICROEMULSION DATA

Microemulsions (M.E.) exist as one of four types; single phase, two phase M.E.⇌water (upper), two phase M.E.⇌oil (lower) and 3 phase water⇌M.E.⇌oil (middle). The transition upper→middle→lower is called a hydrophilic shift since it progressively involves the absorption of water and rejection of oil. A hydrophilic shift results from increasing hydrophile/lipophile (H/L) ratio in the surfactant, increasing alkane carbon number of the oil, increasing temperature (for sulfonate surfactants) and decreasing salinity in the water. The reverse transition, lower→middle→upper is called a lipophilic shift and involves the absorption of oil and rejection of water.

During a hydrophilic shift, the microemulsion phase takes up more water and rejects more oil. When the amount of water and oil taken up into the microemulsion are equal, the microemulsion is a balanced, or middle phase microemulsion. At this point the oil and water uptake are equal. The larger the middle phase volume for a given amount of surfactant, the greater the oil and water uptake at balance. Oil and water uptake at balance depend on surfactant type as well as H/L ratio, salinity, alkane carbon number and temperature.

The middle phase volume also depends on the amount of surfactant. If the surfactant concentration is increased sufficiently, the excess oil and water phases are completely absorbed and the system becomes single phase. This microemulsion is very sensitive to small temperature changes.

Preparation of the Microemulsions

Balanced single phase microemulsions are transparent to translucent homogeneous fluids containing equal volumes of oil and water with the required amount of a suitable surfactant. Using a range of normal alkanes as the oil and 1% NaCl solution as the aqueous phase, a mixture of two sulfonate surfactants were adjusted to yield balanced, homogeneous microemulsions. The surfactants were the mono-ethanol amine salt to branched nonyl o-xylene sulfonic acid ($C_9$* XS-MEA) and octadecyl o-xylene sulfonic acid ($C_{18}$* XS-MEA). The ratio of these two surfactants and the surfactant concentration used to prepare the single phase microemulsions are given in Table VI for selected normal alkanes.
*=branched

TABLE VI

| | Balanced Single-Phase Sulfonate Microemulsions at 25° C. | |
|---|---|---|
| M.E. Oil | $C_9$*XS-MEA/$C_{18}$*XS-MEA | Surfactant Concentration |
| Hexane | .585/.415 | 4 g/dl |
| Octane | .545/.455 | 5 g/dl |
| Decane | .495/.505 | 6 g/dl |
| Dodecane | .460/.540 | 7 g/dl |
| Tetradecane | .350/.650 | 8 g/dl |

The compositions in this table show certain trends typical of microemulsion behavior. As the alkane carbon number increases from 6 to 14, the $C_9$*XS-MEA/$C_{18}$*XS-MEA ratio, i.e., the H/L ratio, decreases. This reduction in H/L ratio is required to compensate for the hydrophilic shift caused by increasing alkane carbon number of the oil. Thus, to form balanced microemulsions with higher alkanes, we must use more lipophilic surfactants. In addition, higher alkanes also require higher surfactant concentrations to make homogeneous single phase microemulsions. This is because the surfactants have lower oil and water uptakes with larger oil molecules.

Heat Treatment of Oil-Shale

All samples of oil-shale which were used for the following examples were Green River shale pulverized to 100 mesh (U.S. Sieve Size) and heat treated at 400° C. for 1 hour in a nitrogen atmosphere.

EXAMPLES 13-15 AND COMPARATIVE EXAMPLES H-J

To evaluate the ability of microemulsions to extract oil from oil-shale, 12 ml of each of the hexane, decane, tetradecane microemulsions described in Table VI above were shaken with 0.6 gm of heat-treated Green River oil-shale. For the comparative examples, the neat oils were used as controls and were also shaken with 0.6 gm of heat-treated Green River oil-shale. In addition, toluene was used as a blank and shaken with 0.6 gm of the heat-treated oil-shale because toluene was found to be a very efficient extractant for the heat-treated oil-shale. All samples were heated to and held at 70° C. for 24 hours during which time they phase separated. The blanks separated into bottom sediment (shale) and amber colored oils except for the toluene which was almost black. The microemulsions separated into bottom sediment (shale) and microemulsion in equilibrium with very dark-colored oil. The amount of oil differed with the alkane carbon number, decane yielding the largest volume which occupied about ⅓ of the tube. The tetradecane microemulsion gave less than 1 ml of oil. This difference probably reflects differences in distance from the temperature—induced phase boundary which depend both on alkane carbon number and surfactant concentration.

The oil phases were spectrophotometrically analyzed relative to the toluene extract as follows: the toluene extract was diluted in stages and the visible spectrum measured. These samples absorbed over the entire visible spectrum, absorbed most strongly near the UV end, and showed no absorption peaks. We, therefore, arbitrarily chose 500 NM to compare samples. Optical densities relative to toluene extract dilutions gave the relative concentrations shown in Table VII below. The alkane blanks had only 8-9% of the shale-oil concentration in toluene while the microemulsion oils had 30% of the toluene extract shale-oil concentration. Thus, the microemulsions excess oil phases were more than 3 times more concentrated than the respective alkane blanks in extracted shale-oil but only ⅓ as concentrated in shale-oil as toluene. Though the shale-oil appears to concentrate strongly in the microemulsion excess oil phase, the actual amount of shale oil recovered in the excess oil is approximately equal to that recovered by the respective blanks. This is because only about ⅓ the oil originally in the microemulsion separates out as an excess oil phase leaving an undetermined amount of shale-oil in the microemulsion. Note that only the excess oil phase was analyzed spectrophotometrically. The visual color intensity in the residual microemulsion suggests that a significant amount of shale-oil remains with the microemulsion and is not accounted for in the data of Table VII. The fact that the shale-oil is strongly concentrated in the excess alkane phase but not nearly as strongly as in the toluene blank suggests that a microemulsion made with toluene might be even more effective than toluene itself in recovering shale oil.

TABLE VII
MICROEMULSIONS AS SHALE-OIL EXTRACTANTS - OIL PHASE ANALYSIS

| | System | % Shale Oil[1] Rel. to Toluene | Vol. Separated Oil[2] Rel. to Toluene |
|---|---|---|---|
| Ex. 13 | $C_6$ M.E.[3] | 33.1[4] | 0.25 |
| Ex. 14 | $C_{10}$ M.E. | 29.2 | .31 |
| Ex. 15 | $C_{14}$ M.E. | 36.8 | .06 |
| Comp. Ex. H | $C_6$ Oil | 9.3 | — |
| Comp. Ex. I | $C_{10}$ Oil | 8.8 | — |
| Comp. Ex. J | $C_{14}$ Oil | 8.2 | — |

[1]From optical density at 500 NM.
[2]Excess oil phase in equilibrium with microemulsion.
[3]The symbol M.E. denotes microemulsion.
[4]Corrected for hexane evaporative loss = 0.7 ml/6 = 11.7%.

EXAMPLES 16–19 AND COMPARATIVE EXAMPLES K–N

Balanced homogeneous (50/50=brine/toluene) microemulsions were prepared using a combination of bilinear sulfonates, dodecyl benzene monoethanol amine sulfonate ($C_{12}$ BS-MEA derived from Conoco Sulfonic acid) and hexadecyl xylene sodium sulfonate ($C_{16}$ XS-Na). Surfactant ratios, concentrations, and brine salinities were adjusted for balance and are given in Table VIII below. A range of concentrations and salinities was used in order to vary the proximity to the concentration and salinity at which phase separation occurs in order to see whether this would affect the extraction efficiency as well as the amount of oil separating on equilibration at elevated temperatures.

TABLE VIII
Balanced Single Phase Toluene Microemulsions at 25° C.

| $C_{12}$ BS-MEA/$C_{16}$ XS-Na | Surfactant Concn. | % NaCl |
|---|---|---|
| 90/10 (wt. ratio) | 4 g/dl | 1.0 |
| 92/08 | 5 | 1.0 |
| 84/16 | 5 | 0.5 |
| 86/14 | 6 | 0.5 |

Twelve ml. of each of the above microemulsions was shaken with 0.6 gm of heat-treated Green River oil-shale. As a blank, 12 ml. of toluene was prepared in the same way. The experiment was repeated using untreated shale. All the samples and blanks were equilibrated at 70° C. for 24 hrs. Since very little oil separated from the microemulsions, the temperature was raised to 85° C. and the sample re-equilibrated for an additional 24 hrs.

The toluene blank contacting untreated shale separated into bottom sediment and a pale yellow oil. The microemulsions contacting untreated shale separated into bottom sediment and microemulsion in equilibrium with amber colored oil. The darker oil color than the blank indicates that the microemulsion concentrated more shale-oil than the toluene did. This was supported by spectrophotometric analysis. A small absorption peak occured at 390 NM. Optical densities of dilutions of the microemulsion oils compared with the toluene blank yielded the data in Table IX. The microemulsion oils were more than 3 times more concentrated in shale-oil than the toluene blank.

Both the toluene and microemulsions contacting heat-treated shale were intensely black. The microemulsions split out a black oil phase which was spectrophotometrically analyzed at 500 NM. Data are given in Table X. The microemulsion oils were more than 3 times more concentrated in shale-oil than the toluene blank. Since ½ or less of the initial oil in the microemulsion was recoverd as an excess oil phase, only part of the extracted shale-oil is represented in the data shown in Tables IX and X. Even so, almost 50% as much shale-oil shows up in the microemulsion excess oil phase as in the toluene blank. (See, for example, the product of % Shale Oil X Vol. Separated Oil for the 90/10 microemulsion in Table X) In addition, the intense black color in the residual microemulsion indicates the presence of more shale-oil than was accounted for in the excess oil phase. If the system were driven to a higher temperature than 85° C. or, preferably, formulated to be more temperature-sensitive, additional shale-oil could be recovered from the residual microemulsion.

TABLE IX
MICROEMULSIONS AS SHALE OIL EXTRACTANTS: OIL PHASE ANALYSES - UNTREATED SHALE

| | Toluene M.E. | % Shale Oil[1] Rel. to Toluene | Vol. Separated Oil Rel. to Toluene |
|---|---|---|---|
| Comp. Ex. K | 4% 90/10[2] at 1.0% NaCl | 330 | 0.14 |
| Comp. Ex. L | 5% 92/08 at 1.0% NaCl | 319 | 1.10 |
| Comp. Ex. M | 5% 84/16 at 0.5% NaCl | 330 | 0.06 |
| Comp. Ex. N | 6% 86/14 at 0.5% NaCl | 340 | 0.06 |

[1]From optical density at 390 NM
[2]Wt. ratio of $C_{12}$ BS-MEA/$C_{16}$ XS-Na

TABLE X
MICROEMULSIONS AS SHALE OIL EXTRACTANTS: OIL PHASE ANALYSES - HEAT TREATED SHALE

| | Toluene M.E. | % Shale Oil[1] Rel. to Toluene | Vol. Separated Oil Rel. to Toluene |
|---|---|---|---|
| Ex. 16 | 4% 90/10[2] at 1.0% NaCl | 336 | 0.150 |
| Ex. 17 | 5% 92/08 at 1.0% NaCl | 374 | 0.125 |
| Ex. 18 | 5% 84/16 at 0.5% NaCl | 330 | 0.117 |
| Ex. 19 | 6% 86/14 at 0.5% NaCl | 387 | 0.071 |

[1]From optical density at 500 NM
[2]Wt. ratio of $C_2$ BS-MEA/$C_{16}$ XS-Na

EXAMPLE 20 AND COMPARATIVE EXAMPLE O

Packed bed recovery experiments in a flow-through mode were run to study the effect of contact time and shale particle size. The above experiments were run with 100 mesh and finer particle size. For the following flow-through experiments, 10–14 mesh heat-treated Green River oil-shale was used.

Two shortened 100 ml burettes fitted with syringe type fittings were packed with about 22 g each of crushed heat-treated shale and mounted vertically. The previously described microemulsion composition, $C_{12}$ BS-MEA/$C_{16}$ XS-Na=90/10 containing 4 g/dl surfactants in 50/50 toluene/1% NaCl solution was passed through one column while an equal volume of toluene was flowed through the other. The first pore volume of fluids was added at room temperature over a period of ½ hour and the "pore" (void) volume calculated from the increase in weight. The temperature was then raised to 70° C. (with heating tapes), and the second pore volume injected over a period of about 4 hours giving the first pore volume collected an average residence time of 2 hours. The third pore volume was added over about 4 hours giving the second pore volume collected sions are used to extract oil from heat treated oil-shale.

TABLE XI

SHALE OIL EXTRACTION BY MICROEMULSIONS IN FLOW-THROUGH MODE

| P.V. No. | Tot. Vol. | X's[1] Oil | Corrected for Shale Tot. Vol. | X's Oil | Excess Oil Phase Rel. Concn.[2] | Rel. Vol.[2] | Rel. Am't[2,3] |
|---|---|---|---|---|---|---|---|
| Example 20 | | | | | | | |
| M.E. Run: 21.93 gm shale 5.48 gm shale oil | | | | | | | |
| 1 | 12.40 | 2.77 | 13.03 | 2.91 | 7.795 | 0.0463 | 0.361 |
| 2 | 12.31 | 3.23 | 12.93 | 3.39 | 6.779 | .0540 | .366 |
| 3 | 12.92 | 3.69 | 13.57 | 3.88 | 1.851 | .0618 | .114 |
| 4 | 11.77 | 3.15 | 12.37 | 3.31 | .790 | .0527 | .042 |
| 5 | 12.15 | 3.38 | 12.76 | 3.55 | .600 | .0565 | .034 |
| Total | 61.55 | 16.22 | 64.66 | 17.04 | 3.380 | .2713 | .917 |
| Comparative Example 0 | | | | | | | |
| Toluene Run: 23.04 gm shale 5.76 gm shale oil | | | | | | | |
| 1 | 12.85 | — | — | — | 3.277 | 0.2046 | 0.671 |
| 2 | 12.56 | — | — | — | 1.173 | .2000 | .235 |
| 3 | 12.54 | — | — | — | .406 | .1997 | .081 |
| 4 | 12.62 | — | — | — | .069 | .2010 | .014 |
| 5 | 12.23 | — | — | — | 0 | .1948 | .000 |
| Total | 62.80 | — | — | — | 0.999 | 1.000 | 1.001 |

[1] Denotes separated excess oil phase.
[2] Normalized to total recovery by toluene.
[3] Relative amount of shale-oil contained in the relative volume.

a residence time of 4 hours. The third pore volume was soaked for about 18 hours before collection. The fourth and fifth pore volumes had residence times of about 1 hour each.

The five pore volumes of the microemulsion run and the toluene blank were stored 1 day at 80° C. to allow the microemulsions to phase equilibrate. The volume of excess oil phase was measured and the excess oil analyzed by visible spectrophotometry as described previously. The results of these measurements are recorded in Table XI.

Colums 2 and 3 in Table XI list the volumes of fluids collected for each pore volume, and in the case of the microemulsion, the volume of excess oil phase separated at 80° C. Since the microemulsion run had about 5% less shale than the toluene blank, the microemulsion run volumes were corrected by increasing the volumes by 5% in order to make a direct comparison. These corrected volumes are listed in the fourth and fifth columns.

The shale-oil concentrations and excess oil phase volumes relative to the toluene blank are listed in columns 6 and 7. The product of these two values gives the relative amount of shale-oil recovered in the excess oil phase. The microemulsion run in the excess oil phase alone recovers 92% of the amount recovered by the toluene blank under the same conditions. None of the shale-oil remaining in the microemulsion was included in this analysis. As evidenced by the black color there still remains a significant amount of shale-oil held in the residual microemulsion by the unrecovered microemulsion oil (toluene). Only a little over ½ of the initial oil in the microemulsion separates on equilibration. This is shown by the total excess oil phase relative volume of 27% in Table XI. If all the oil had separated this relative volume would be 48%. Approximately 45–50% of the microemulsion oil remains unrecovered in the residual microemulsion. Separation could be improved by running at higher temperatures or reformulating the microemulsion.

This experiment illustrates the feasibility of the in situ process of the present invention wherein microemulsions are used to extract oil from heat treated oil-shale.

What is claimed is:

1. An in situ method for recovering oil from an oil-shale deposit, which method comprises:
   (a) fracturing a block of oil-shale to an effective degree;
   (b) heating the fractured oil-shale to a temperature of about 360° C. to about 475° C.;
   (c) maintaining the fractured oil-shale within the temperature range of about 360° C. to about 475° C. for an effective amount of time;
   (d) cooling the heat treated block of fractured oil-shale to below the boiling point of the aqueous phase of the microemulsion;
   (e) injecting a microemulsion or a coarse emulsion containing a microemulsion phase into the heat treated fractured block of oil-shale, wherein the microemulsion is comprised of:
      (i) about 0.3 to about 98 wt.% of an extracting agent capable of extracting organic material from the heat treated oil-shale;
      (ii) about 1 to about 99 wt.% of water containing up to about 25 wt.% dissolved inorganic salts, and
      (iii) about 0.2 to about 20 wt.% of at least one surfactant capable of forming a microemulsion;
   (f) recovering the shale-oil containing microemulsion from the block;
   (g) treating the recovered microemulsion to cause the separation of an excess oil phase comprised of extracting agent and shale-oil; and
   (h) separating the shale-oil from the extracting agent.

2. The method of claim 1 wherein component (i) of the microemulsion is a cut, boiling at a temperature from about 20° C. to about 200° C., from an oil-shale liquid, a coal liquid, or a petroleum stream.

3. The method of claim 1 wherein component (iii) of the microemulsion is a mixture of an anionic surfactant with at least one other anionic, nonionic; or cationic cosurfactant.

4. The method of claim 1 wherein component (iii) of the microemulsion is one or more anionic surfactants selected from the group consisting of:
   (a) sulfonates represented by the formula $$[R^1-SO_3]^-Y^+$$

wherein $R^1$ is $C_8$ to $C_{25}$ aliphatic, $C_{14}$ to $C_{36}$ alkylaryl or $R^2-(OCH_2CH_2)_n$ where $R^2$ has the same definition as $R^1$ and n is an integer from 1 to 60, and Y is hydrogen or a monovalent cation such as alkali metal or $N(R^3)^+{}_4$ where each $R^3$ is independently hydrogen, alkyl or hydroxy substituted alkyl, each of 1 to 4 carbon atoms;

(b) sulfonates represented by the formula $$[R^4-OSO_3]^-Y^+$$

where $R^4$ is $C_8$ to $C_{25}$ aliphatic, $C_{14}$ to $C_{38}$ alkyl-aryl or $R^5-(OCH_2CH_2)_n$ where $R^5$ has the same definition as $R^4$ and n is an integer from 1 to 60, and Y is hydrogen, alkali metal cation or $N(R^3)^+{}_4$, where each $R^3$ is independently hydrogen, alkyl of 1 to 4 carbon atoms or hydroxyalkyl of 1 to 4 carbon atoms; and (c) surfactants represented by the formula $$R_aO(C_3H_6O)_m(C_2H_4O)_nYX$$

where $R_a$ is a $C_8$ to $C_{30}$ aliphatic radical or benzene substituted by $C_6$ to $C_{24}$ alkyl or alkenyl, m and n are at least 1 and preferably have average values between about 1 to 10, respectively; Y is sulfate, sulfonate, carboxylate or phosphate and X is a cation.

5. The method of claim 4 wherein the surfactant is one or more sulfonates in which $R^1$ is a $C_{14}$ to $C_{36}$ alkylaryl group selected from the group consisting of alkylphenyl, alkyltolyl, and alkylxylyl.

6. The method of claim 5 wherein $R^1$ is an alkylbenzene or alkylxylene with the alkyl containing from 8 to 18 carbon atoms.

7. The method of claim 1 wherein component (iii) of the microemulsion is one or more nonionic surfactants which are selected from the ethoxylated derivatives of phenols, amines, carboxylic acids, alcohols, mercaptons, and polyhydroxy compounds.

8. The method of claim 7 wherein the surfactant is one or more ethoxylated phenols represented by the formula $$(R^6)_r-A-[O(CH_2CH_2O)_p]_qH$$

wherein $R^6$ is $C_1$ to $C_{24}$ alkyl, A is benzene, naphthalene or diphenyl, p is 2 to 60, q is 1 or 2 and r is 1 to 5 with the proviso that when r is 1, $R^6$ is at least $C_8$.

9. The method of claim 4 wherein at least one nonionic ethoxylated phenol surfactant is present and is represented by the formula $$(R^6)_r-A-[O(CH_2CHd2^O)_p]_qH$$

wherein $R^6$ is $C_1$ to $C_{24}$ alkyl, A is benzene, naphthalene or diphenyl, p is 2 to 60, q is 1 or 2 and r is 1 to 5 with the proviso that when r is 1, $R^6$ is at least $C_8$.

10. The method of claim 4 wherein at least one cationic surfactant is present having the formula $$C_mH_{2m+1}-N\begin{matrix}(CH_2CH_2O)_uH\\(CH_2CH_2O)_vH\end{matrix}$$

where m is from 8 to 25 and the sum of u+v is from 2 to 20.

11. The method of claim 4 wherein at least one amphoteric surfactant is also present and is comprised of an amino moiety and a carboxylic acid or a sulfonic acid moiety.

12. The method of claim 8 wherein at least one amphoteric surfactant is also present and is comprised of an amino moiety and a carboxylic acid or a sulfonic acid moiety.

13. The method of claim 3 wherein the surfactants employed have hydrophilic and lipophilic properties which are balanced.

14. The method of claim 2 wherein the block of oil-shale is heated to, and maintained for an effective amount of time at, a temperature of about 400° C. to about 450° C.

15. The method of claim 5 wherein the block of oil-shale is heated to, and maintained for an effective amount of time at, a temperature of about 400° C. to about 450° C.

* * * * *